US006801982B2

(12) United States Patent
Borkenhagen et al.

(10) Patent No.: US 6,801,982 B2
(45) Date of Patent: Oct. 5, 2004

(54) READ PREDICTION ALGORITHM TO PROVIDE LOW LATENCY READS WITH SDRAM CACHE

(75) Inventors: John M. Borkenhagen, Rochester, MN (US); Brian T. Vanderpool, Rochester, MN (US); Lawrence D. Whitley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 10/057,444

(22) Filed: Jan. 24, 2002

(65) Prior Publication Data

US 2003/0140195 A1 Jul. 24, 2003

(51) Int. Cl.$^7$ .............................................. G06F 12/00
(52) U.S. Cl. ...................... 711/118; 711/119; 711/137; 711/213
(58) Field of Search .................... 711/118, 119, 711/137, 213

(56) References Cited

U.S. PATENT DOCUMENTS 5,285,527 A * 2/1994 Crick et al. .................. 711/118
6,523,093 B1 * 2/2003 Bogin et al. ................. 711/137
6,587,927 B2 * 7/2003 Hotta et al. .................. 711/129

FOREIGN PATENT DOCUMENTS

JP           02000165455 A   *   6/2000

* cited by examiner

Primary Examiner—Donald Sparks
Assistant Examiner—Ngoc Dinh
(74) Attorney, Agent, or Firm—Arnall Golden Gregory LLP

(57) ABSTRACT

In a method of controlling stores to and reads from a cache, if a read request is in a read queue, then a read is performed. If no read is in the read queue and if a store request is in a store queue and if an early read predict signal is not asserted, then a store is performed. If no read is in the read queue and if a store request is in the store queue and if the early read predict signal is asserted, if a read is detected a read is then performed. Otherwise, if the early read predict is subsequently de-asserted, then a store is performed.

6 Claims, 2 Drawing Sheets

READ PREDICTION ALGORITHM TO PROVIDE LOW LATENCY READS WITH SDRAM CACHE

BACKGROUND OF THE INVENTION

1. Field of the Invention

The present invention relates to computer systems and, more specifically, to cache controllers employed by computer processors.

2. Description of the Prior Art

To improve computer speed, modern computer processing units employ several caches, such as an instruction cache and a data cache, using high speed memory devices. Caches are commonly used to store data that might be repeatedly accessed by a processor to speed up processing by avoiding the longer step of reading the data from memory. Each cache is associated with a cache controller that manages the transfer of data between the processor core and the cache memory.

A cache has many "blocks" that individually store various instructions and data values. The blocks in any cache are divided into groups of blocks called "sets" or "congruence classes." A set is the collection of cache blocks that a given memory block can reside in. For any given memory block, there is a unique set in the cache that the block can be mapped into. The number of blocks in a set is referred to as the associativity of the cache, e.g., 2-way set associative means that for any given memory block there are two blocks in the cache that the memory block can be mapped into. However, several different blocks in main memory can be mapped to any given set. A 1-way set associate cache is direct mapped, that is, there is only one cache block that can contain a particular memory block. A cache is said to be fully associative if a memory block can occupy any cache block, i.e., there is one congruence class, and the address tag is the full address of the memory block.

An exemplary cache line (block) includes an address tag field, a state bit field, an inclusivity bit field, and a value field for storing the actual instruction or data. The state bit field and inclusivity bit fields are used to maintain cache coherency in a multiprocessor computer system to indicate the validity of the value stored in the cache. The address tag is a subset of the full address of the corresponding memory block. A compare match of an incoming address with one of the tags within the address tag field indicates a cache "hit." The collection of all of the address tags in a cache (and sometimes the state bit and inclusivity bit fields) is referred to as a directory, and the collection of all of the value fields is the cache entry array.

When all of the blocks in a congruence class for a given cache are full and that cache receives a request, whether a "read" or a "write," to a memory location that maps into the full congruence class, the cache must "evict" one of the blocks currently in the class. The cache chooses a block by one of a number of means known to those skilled in the art (least-recently used (LRU), random, pseudo-LRU, etc.) to be evicted. If the data in the chosen block is modified, that data is written to the next lowest level in the memory hierarchy which may be another cache or main memory. By the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block.

In a system with central processing unit processors (also referred to herein as "CPU's") running at very high frequencies, system performance can be highly sensitive to main memory latency. One method to reduce latency is to use an L3 cache which is shared by multiple CPU's in the system. Since many of today's CPU's have fairly large L2 caches, the shared cache (L3 cache) must be very large to have a marked impact on system performance. Unfortunately, large L3 caches built from static RAM (SRAM) chips can be quite expensive. A more cost-effective approach is to use synchronous dynamic RAM (SDRAM) chips. The primary drawback with SDRAM is a longer latency and a cycle time of a given memory bank, which can be ten times or so greater than that for high speed SRAM. The cycle time problem can be alleviated by employing many banks in the L3 cache such that the probability of accessing a busy bank is low. However, the latency is still fairly high, and thus the access should start as soon as possible.

In a computer system, read requests (also referred to as "load requests") coming from a given CPU can be satisfied (i) by another CPU if the memory value is held in one of the CPU's caches (e.g., held in a modified or exclusive coherency state using a coherency protocol), (ii) by main memory, or (iii) by a shared cache (in this example a level 3 or L3 cache). One method to reduce latency of data supplied by the L3 cache is to access L3 data speculatively. In other words, the L3 data array is accessed in parallel with the directory and before the transaction snoop responses are known from the other CPU's. This approach can have the advantage of getting the data to the requesting CPU in the minimum amount of time in a system with low system bus utilization. However, when the system is highly utilized, there can be a significant amount of L3 data bandwidth wasted on L3 misses, or hits to modified data in another CPUs L2 cache. The net effect of the increased bandwidth usage can actually be higher average latency. To avoid this problem, the L3 cache access can be delayed until after the directory lookup and snoop responses are known. However, serially accessing the directory can also add a non-trivial amount of latency to data sourced by the L3 cache.

In an application-specific integrated circuit (ASIC) application using external Synchronous Dynamic Random Access Memory (SDRAM), the SDRAM chips have a turnaround penalty when switching from stores to reads. SDRAM's can be operated in either page mode, with many accesses to the same page, or non-page mode where each access opens a bank, performs the memory access, and closes the bank with auto precharge. Commercial workloads have a high percentage of random accesses and as a result, page mode does not provide any performance benefit.

In non-page mode, SDRAM chips are designed for peak performance when consecutive accesses are performed to different banks. A read is performed by first opening a bank, issuing a read command, waiting the requisite number of cycles for the CAS latency, then the data is burst from the SDRAM into the memory controller. The memory controller must wait several cycles for the row to precharge (tRP) before reactivating that bank. A write is performed by opening a bank, issuing a write command, waiting the requisite number of cycles for the write CAS latency, bursting the data from the memory controller to the SDRAM's, then waiting for the write recovery (tWR) as well as the row precharge time (tRP). Due to the extra time required for write recovery as well as waiting for the write to complete, it is time consuming to turn the bus around from performing writes to reads. This is called the bus turnaround penalty. When a read is waiting for a store to complete, an SDRAM utilization conflict is said to occur.

To minimize the bus turnaround penalty and improve performance, memory interfaces have used read and store queues. Using read queues, the processor may issue reads faster than data can be returned from memory, allowing the memory controller to take advantage of bank access patterns to improve memory bandwidth. Using store queues, the processor can pass the write to the memory interface and continue processing under the assumption that the memory interface will perform the store to memory at a future time. Since the processor will wait for the results of a memory read, a memory interface will prioritize reads over stores.

Due to the read prioritization and the limited size of the store queue, the memory controller must ensure that the store queue can accept all stores. This can be done with a high and low watermark on the store queue. When the low watermark is exceeded, writes will occur until a fully qualified read is present in the read queue. If writes from the store queue are stalled and the store queue increases in depth over the high watermark, all reads are held off and writes are given highest priority until the store queue is back under the high watermark. The purpose of the low watermark is to minimize the number of times the bus must be switched from writing to reading and to minimize the effect of the bus turnaround time on read latency. The low watermark is typically set to half the size of the store queue to reduce the number of SDRAM utilization conflicts.

In some cases, if the number of writes is less than the low watermark then any writes pending in the store queue will go unwritten, even in the absence of available reads. This can result in time being wasted in the subsequent event of writes being interrupted by incoming reads.

Therefore, there is a need for a system that predicts incoming reads and that allows unrestricted writes when no read is predicted.

SUMMARY OF THE INVENTION

The disadvantages of the prior art are overcome by the present invention which, in one aspect, is a method of controlling stores to and reads from a cache. If a read request is in a read queue, then a read is performed. If no read request is in the read queue and if a store request is in a store queue and if an early read predict signal, indicating that a read request has been detected on a processor bus, is not asserted, then a store is performed. If no read request is in the read queue and if a store request is in the store queue and if the early read predict signal is asserted then, if a read is detected, then performing a read, otherwise, if the early read predict is subsequently de-asserted, then a store is performed.

In another aspect, the invention is an apparatus for controlling reads from and stores to a cache that includes a logic element and a cache control element. The logic element is in data communication with a processor bus and is capable of asserting an early read predict signal when a read request is detected on the processor bus. The cache control element causes one of several operations to be performed on the cache. If a read request is in a read queue, then the cache control element causes a read to be performed. If no read request is in the read queue and if a store request is in a store queue and if an early read predict signal is not asserted, then the cache control element causes a store to be performed. If no read request is in the read queue and if a store request is in the store queue and if the early read predict signal is asserted then, if a read request is detected, the cache control element causes a read to be performed, or if the early read predict is subsequently de-asserted, then the cache control element causes a store to be performed.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
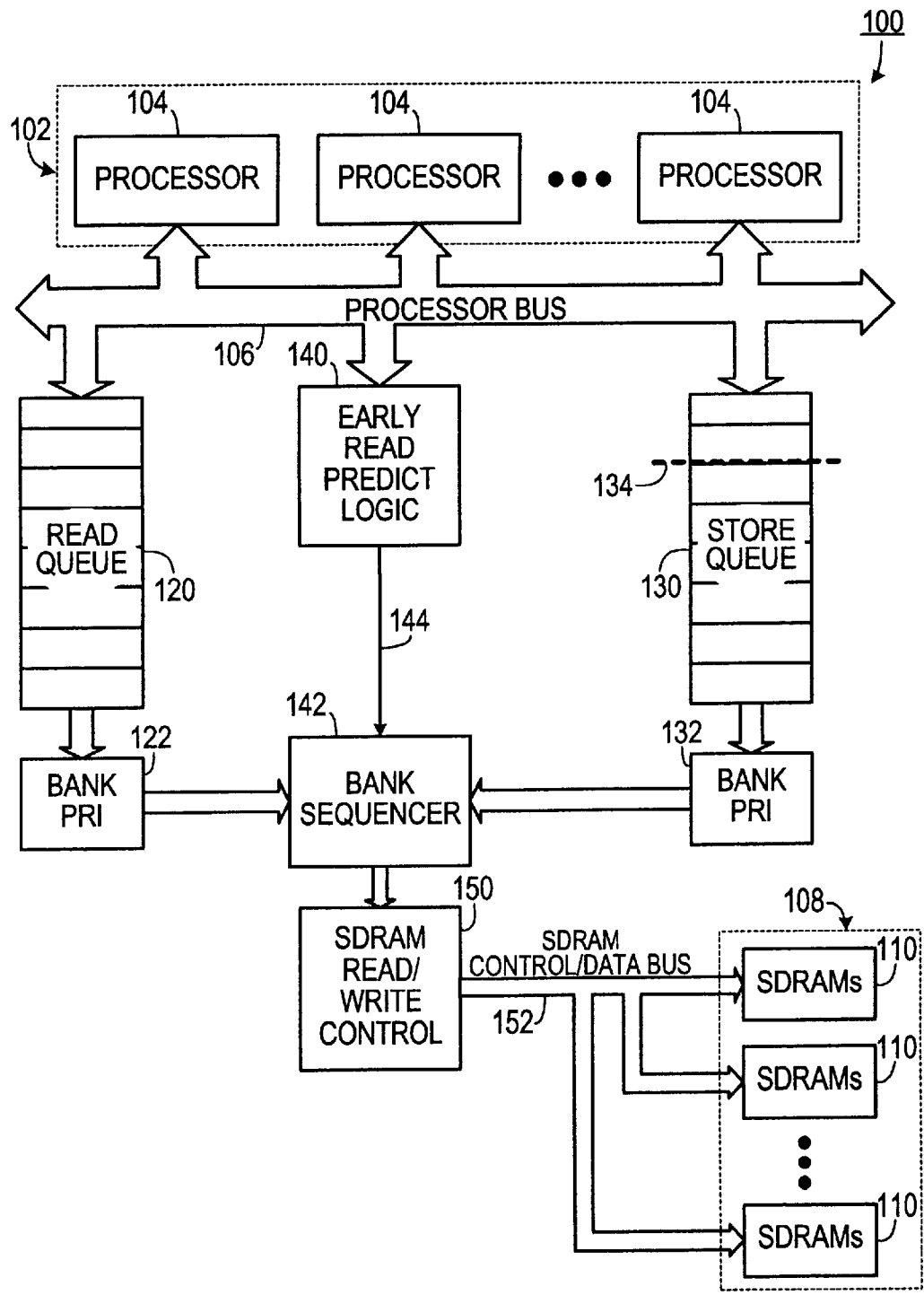
FIG. 1 is a schematic diagram of one illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of the invention includes a computer system 100 that minimizes the bus turnaround penalty associated with accessing synchronous dynamic random access memory (SDRAM) chips 110, such as those used as part of a cache 108, which could include a memory storage subsystem consisting of external SDRAM's or could reside in a main memory. In such a system, a processor unit 102, which may include a plurality of processors 104 communicates with the cache 108 via a processor bus 106. As the processor unit 102 requires data from the cache 108, it will issue read requests to a read queue 120. A read bank prioritization circuit 122 delivers each read request to a bank sequencer 142. The bank sequencer 142 then transfers the request to a read/write control unit 150, which controls the states of the individual SRAM's 110 via a control/data bus 152.

Similarly, as the processor unit has data to write to the cache 108 it will issue a store request to a store queue 130. A store bank prioritization circuit 132 delivers subsequent store requests to the bank sequencer 142, which then transfers each request to the read/write control unit 150. Generally, read requests in the read queue 120 take priority over store requests in the store queue. However, a high watermark 134 indicates a point at which, if the number of store requests waiting in the store queue exceeds the high watermark 134, reads will cease and stores will have a higher priority than reads.

An early read predict logic circuit 140 asserts an early read predict signal 144 when a read request is detected on the processor bus 106. The bank sequencer 142 causes stores to be performed anytime there are store requests in the store queue 130 if the early read predict signal 144 is not asserted and there are no read requests in the read queue 120. If the early read predict signal is asserted, then the bank sequencer 142 will cease performing stores and will wait until either the read on the processor bus 106 appears at the read bank prioritization circuit 122 (at which time a read will be performed) or the early read predict signal is de-asserted (at which point stores will resume). One example of a situation in which a read request from one processor triggers the early read predict signal 144, but fails to appear at the read bank prioritization circuit 122 could arise when the requested data is found in the local memory of another processor.

For each read and write command, there is a period of time between the read or write command being issued to the SDRAM 110 and data being transferred on the databus. The SDRAM databus 152 needs a bus turn around time to allow the data for a store to be written out to the SDRAM's 110 before a read command can be issued. Similarly, there is a bus turnaround time for the SDRAM's 110 to return read data on the databus before the memory controller can issue a store. Since multiple commands can be overlapped on the SDRAM data bus 152, all reads or all writes can be scheduled back to back, and the SDRAM data bus 152 will be fully utilized. It is switching between reads and writes that incurs this bus turnaround penalty which the early read predictor 140 minimizes.

Figure 2:
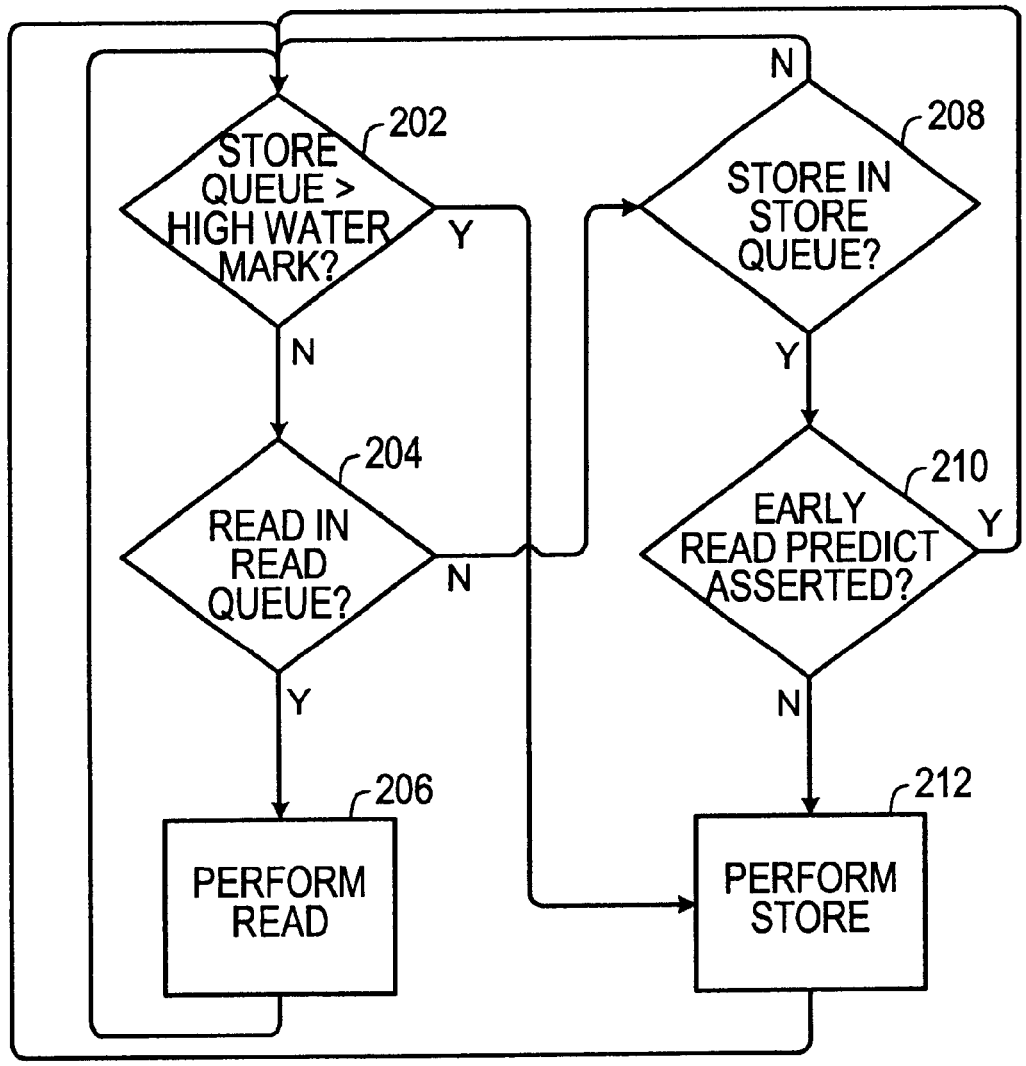
FIG. 2 is a flow chart demonstrating operation of an early read predict cache control, according to one embodiment of the invention.

One illustrative flow chart demonstrating the operation of the bank sequencer 142 is shown in FIG. 2. If the number of store requests in the store queue is not greater than the high watermark 202 and if there is a read request in the read queue 204, then a read is performed 206. If the number of store requests in the store queue is greater than the high watermark 202, then a store is performed 212. If no read request is in the read queue 204, and there is a store in the store queue 208, then the system determines if the early read predict signal has been asserted 210. If the early read predict signal has not been asserted, then the system will perform a store 212. Otherwise, the system will determine if the number of store requests in the store queue is not greater than the high watermark 202 and continue processing stores and reads accordingly.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of controlling stores to and reads from a cache, comprising the steps of:
    a. if a read request is in a read queue, then performing a read from the cache;
    b. if no read request is in the read queue and if a store request is in a store queue and if an early read predict signal, indicating that a read request has been detected on a processor bus, is not asserted, then performing a store to the cache; and
    c. if no read request is in the read queue and if a store request is in the store queue and if the early read predict signal is asserted then:
        i. if a read is detected, then performing a read from the cache; or
        ii. if the early read predict is subsequently de-asserted, then performing a store to the cache.

2. The method of claim 1, further comprising the step of, upon detecting a read request in the read queue, determining if the store queue has a number of entries that is greater than a predetermined high watermark.

3. The method of claim 2, further comprising the step of, upon determining that the store queue has a number of entries that is greater than a predetermined high watermark, performing a store to the cache.

4. An apparatus for controlling reads from and stores to a cache, comprising:
    a. a logic element, in data communication with a processor bus, that is capable of asserting an early read predict signal when a read request is detected on the processor bus; and
    b. a cache control element that causes the following operations to be performed on the cache:
        i. if a read request is in a read queue, then performing a read from the cache;
        ii. if no read request is in the read queue and if a store request is in a store queue and if an early read predict signal is not asserted, then performing a store to the cache; and
        iii. if no read request is in the read queue and if a store request is in the store queue and if the early read predict signal is asserted then, if a read request is detected, then performing a read from the cache, or if the early read predict is subsequently de-asserted, then performing a store to the cache.

5. The apparatus of claim 4, further comprising a logic element that determines if the store queue has a number of entries that is greater than a predetermined high watermark.

6. The apparatus of claim 5, wherein the cache control element is capable of causing a store to be performed when a store is in the store queue and when the logic element determines that the store queue has a number of entries that is greater than a predetermined high watermark.

* * * * *